United States Patent
Lee et al.

(10) Patent No.: US 9,864,704 B2
(45) Date of Patent: Jan. 9, 2018

(54) MEMORY CONTROLLER COMMUNICATING WITH HOST, OPERATING METHOD THEREOF, AND COMPUTING SYSTEM INCLUDING THE SAME

(71) Applicant: SK hynix Inc., Gyeonggi-do (KR)

(72) Inventors: Hyun Ju Lee, Gyeonggi-do (KR); Jae Han Park, Seoul (KR); Dae Geun Jee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 592 days.

(21) Appl. No.: 14/483,959

(22) Filed: Sep. 11, 2014

(65) Prior Publication Data

US 2015/0286581 A1 Oct. 8, 2015

(30) Foreign Application Priority Data

Apr. 3, 2014 (KR) ........................ 10-2014-0039989

(51) Int. Cl.
| | |
|---|---|
| *G06F 21/62* | (2013.01) |
| *G06F 12/14* | (2006.01) |
| *G06F 3/06* | (2006.01) |
| *G06F 21/00* | (2013.01) |

(52) U.S. Cl.
CPC ........ *G06F 12/1408* (2013.01); *G06F 3/0623* (2013.01); *G06F 3/0658* (2013.01); *G06F 3/0679* (2013.01); *G06F 21/62* (2013.01); *G06F 21/00* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 7,194,627 | B2* | 3/2007 | Cheung | G06F 21/85 713/168 |
| 7,533,273 | B2* | 5/2009 | Patariu | H04L 9/0637 380/29 |
| 2005/0251617 | A1* | 11/2005 | Sinclair | G06F 3/061 711/103 |
| 2007/0043667 | A1* | 2/2007 | Qawami | G06F 21/10 705/50 |
| 2008/0005586 | A1* | 1/2008 | Munguia | G06F 12/1408 713/189 |
| 2008/0201622 | A1* | 8/2008 | Hiew | G11C 29/56 714/718 |
| 2008/0320204 | A1* | 12/2008 | Jo | G06F 12/0246 711/100 |
| 2009/0122989 | A1* | 5/2009 | Asnaashari | G06F 21/77 380/278 |

(Continued)

FOREIGN PATENT DOCUMENTS

| | | |
|---|---|---|
| KR | 1020070108646 | 11/2007 |
| KR | 1020120135216 | 12/2012 |

*Primary Examiner* — Jason K. Gee
*Assistant Examiner* — Thanh T Le
(74) *Attorney, Agent, or Firm* — IP & T Group LLP (57) ABSTRACT

A semiconductor device includes a nonvolatile memory storing encrypted management data, and a memory controller coupled between the nonvolatile memory and a host. The memory controller is allocated a free area in a host memory from the host and is suitable for storing the encrypted management data in the free area.

19 Claims, 7 Drawing Sheets

(56) References Cited

U.S. PATENT DOCUMENTS

| | | | |
|---|---|---|---|
| 2013/0042095 A1* | 2/2013 | Jung | G06F 9/24 |
| | | | 713/2 |
| 2013/0297948 A1* | 11/2013 | Lee | G06F 21/602 |
| | | | 713/193 |
| 2014/0156880 A1* | 6/2014 | Shim | G06F 3/061 |
| | | | 710/22 |
| 2014/0156964 A1* | 6/2014 | Choi | G06F 12/0646 |
| | | | 711/171 |
| 2015/0019794 A1* | 1/2015 | Byun | G06F 12/0246 |
| | | | 711/103 |
| 2015/0019904 A1* | 1/2015 | Cho | G06F 11/1012 |
| | | | 714/6.11 |
| 2015/0106573 A1* | 4/2015 | Yi | G06F 3/0658 |
| | | | 711/148 |

* cited by examiner

MEMORY CONTROLLER COMMUNICATING WITH HOST, OPERATING METHOD THEREOF, AND COMPUTING SYSTEM INCLUDING THE SAME

CROSS-REFERENCE TO RELATED APPLICATION

The present application claims priority to Korean patent application number 10-2014-0039989, filed on Apr. 3, 2014, the entire disclosure of which is incorporated herein in its entirety by reference.

BACKGROUND

Field of Invention

Various exemplary embodiments of the present invention relate generally to an electronic device and, more particularly, to a memory controller, an operating method thereof, and a computing system including the same.

Description of Related Art

Semiconductor memory devices are memory devices composed of semiconductor materials such as silicon (Si), germanium (Ge), gallium arsenide (GaAs), indium phosphide (InP), and the like. Semiconductor memory devices are classified into volatile memory devices and nonvolatile memory devices.

Volatile memory devices lose stored data when their power supply is interrupted. Volatile memory devices include static random access memory (SRAM), dynamic RAM (DRAM), synchronous DRAM (SDRAM), etc. In contrast, nonvolatile memory devices retain stored data even when their power supply is interrupted. Nonvolatile memory devices include read only memory (ROM), programmable ROM (PROM), erasable programmable ROM (EPROM), electrically erasable programmable ROM (EEPROM), flash memory, phase-change RAM (PRAM), magnetoresistive RAM (MRAM), resistive RAM (RRAM), ferroelectric RAM (FRAM), etc. Flash memories are classified into NOR type and NAND type.

A semiconductor device may include a nonvolatile memory device and a memory controller for controlling the nonvolatile memory device. The semiconductor device may be coupled to an external host and transfer data to and from the host. For example, the semiconductor device may provide data stored in the nonvolatile memory device to the host and, in response to a request from the host, the semiconductor device may write data to the nonvolatile memory device.

The semiconductor device may access a certain area of memory included in the host. The semiconductor device and the host may be configured in a unified memory architecture (UMA). Since some storage space of the host memory is allocated to and used by the semiconductor device, performance of the semiconductor device may be improved. However, since data related to the semiconductor device is stored in the host memory, security issues may arise for data stored in the host memory.

SUMMARY

Exemplary embodiments of the present invention are directed to enhancing security of a computing system including a semiconductor device.

A semiconductor device according to an embodiment of the present invention may include a nonvolatile memory suitable for storing encrypted management data and a memory controller coupled between the nonvolatile memory and a host, wherein the memory controller is allocated a free area in a host memory from the host and is suitable for storing the encrypted management data in the free area.

The memory controller may include a working memory suitable for storing original management data obtained by decrypting the encrypted management data, a central processing unit suitable for requesting the host to allocate the free area in the host memory, and an encryption/decryption circuit suitable for communicating the original management data and the encrypted management data between the working memory and the free area by encrypting and decrypting the original management data and the encrypted management data, respectively, and communicating the encrypted management data between the nonvolatile memory and the free area without encrypting and decrypting the encrypted management data, in response to control of the central processing.

The memory controller may further include a memory interface suitable for communicating with the nonvolatile memory, a host interface suitable for communicating with the host, and a data bus suitable for coupling the memory interface, the encryption/decryption circuit and the working memory, wherein the encryption/decryption circuit is coupled between the host interface and the data bus.

When the original management data of the working memory is outputted to the host, the encryption/decryption circuit may transfer the original management data from the working memory to the host interface by encrypting the original management data.

When the encrypted management data of the nonvolatile memory is outputted to the host, the encryption/decryption circuit may transfer the encrypted management data from the memory interface to the host interface without the encrypting and decrypting of the encrypted management data.

When the encrypted management data of the free area is loaded into the working memory, the encryption/decryption circuit may transfer the encrypted management data from the host interface to the working memory by decrypting the encrypted management data.

When the encrypted management data of the free area is stored in the nonvolatile memory, the encryption/decryption circuit may transfer the encrypted management data from the host interface to the memory interface without the encrypting and decrypting of the encrypted management data.

The encrypted management data may be mapping information between a physical block address corresponding to the nonvolatile memory and a logical block address corresponding to the host.

The encrypted management data may be a boot code to initialize the memory controller.

A memory controller processing management data between a host and a nonvolatile memory according to another embodiment of the present invention may include a working memory suitable for storing the management data, a memory interface suitable for communicating with the nonvolatile memory, a host interface suitable for communicating with the host, a central processing unit suitable for requesting a free area in a host memory of the host, and an encryption/decryption circuit suitable for encrypting and decrypting the management data when the management data is communicated between the working memory and the free area, and bypassing the management data when the management data is communicated between the nonvolatile memory and the free area, in response to control of the central processing unit.

The encrypted management data obtained by encrypting the management data may be stored in the free area and the nonvolatile memory.

The encryption/decryption circuit may be coupled to the working memory and the memory interface through a data bus, and the host interface may be coupled to the data bus through the encryption/decryption circuit.

The encryption/decryption circuit, the working memory, the memory interface and the host interface may operate in response to control of the central processing unit through a control bus.

The encryption/decryption circuit may include a first transmission/reception unit suitable for receiving the management data from the working memory and the memory interface through a data bus, a second transmission/reception unit suitable for communicating with the host interface, an encryption unit suitable for encrypting the management data received through the first transmission/reception unit and transferring encrypted management data to the second transmission/reception unit, a bypass channel suitable for transferring the management data received through the first transmission/reception unit to the second transmission/reception unit by bypassing the encryption unit, and a control unit suitable for controlling the first transmission/reception unit to output the management data received from the working memory through the data bus to the encryption unit, and output the management data received from the memory interface through the data bus to the bypass channel in response to a bypass command from the central processing unit.

The encryption/decryption circuit may include a first transmission/reception unit suitable for communicating with the working memory and the memory interface through a data bus, a second transmission/reception unit suitable for receiving the management data from the host interface, a decryption unit suitable for decrypting the management data received through the second transmission/reception unit and transferring decrypted management data to the first transmission/reception unit, a bypass channel suitable for transferring the management data received through the second transmission/reception unit to the first transmission/reception unit by bypassing the decryption unit, and a control unit suitable for controlling the second transmission/reception unit to output the management data received from the host interface to one of the decryption unit and the second bypass channel in response to a bypass command from the central processing unit.

A method of operating a memory controller processing management data between a nonvolatile memory and a host according to another embodiment of the present invention may include generating original management data by decrypting the management data read from the nonvolatile memory and storing the original management data in a working memory of the memory controller, requesting a free area in a host memory of the host, encrypting or decrypting the management data when the management data is communicated between the working memory and the free area, and bypassing the encrypting or decrypting of the management data when the management data is communicated between the nonvolatile memory and the free area.

The encrypting or decrypting of the management data may include generating encrypted management data by encrypting the original management data stored in the working memory, and outputting the encrypted management data to the host.

The encrypting or decrypting of the management data may include receiving the management data from the free area, generating the original management data by decrypting the management data, and storing the original management data in the working memory.

The bypassing of the encrypting or decrypting of the management data may include reading the management data from the nonvolatile memory, and outputting the management data to the host without encrypting or decrypting the management data.

The bypassing of the encrypting or decrypting of the management data may include receiving the management data from the free area, and outputting the management data to the nonvolatile memory without encrypting or decrypting the management data.

A semiconductor device according to another embodiment of the present invention may include a nonvolatile memory suitable for storing management data, and a memory controller suitable for processing the management data between the nonvolatile memory and a host by encrypting and decrypting the management data, wherein the memory controller stores the management data in a working memory of the memory controller and a host memory of the host to be processed.

The memory controller may communicate the management data between the working memory and the host memory by encrypting and decrypting the management data and communicate the management data between the nonvolatile memory and the host memory without encrypting and decrypting the management data.

DETAILED DESCRIPTION

Various embodiments of the present invention will be described more fully with reference to the accompanying drawings. Only portions necessary to understand operations according to the present invention are described, and other portions will not be described in detail to avoid obscuring the present invention. The invention may, however, be embodied in many different forms and should not be construed as being limited to the embodiments set forth herein; rather, these embodiments are provided so that this disclosure will be thorough and complete, and will fully convey the concept of the invention to those skilled in the art. Various embodiments of the present invention will be described with reference to the accompanying drawings to fully explain the present invention in such a manner that it may easily be carried out by a person with ordinary skill in the art to which the present invention pertains.

Figure 1:
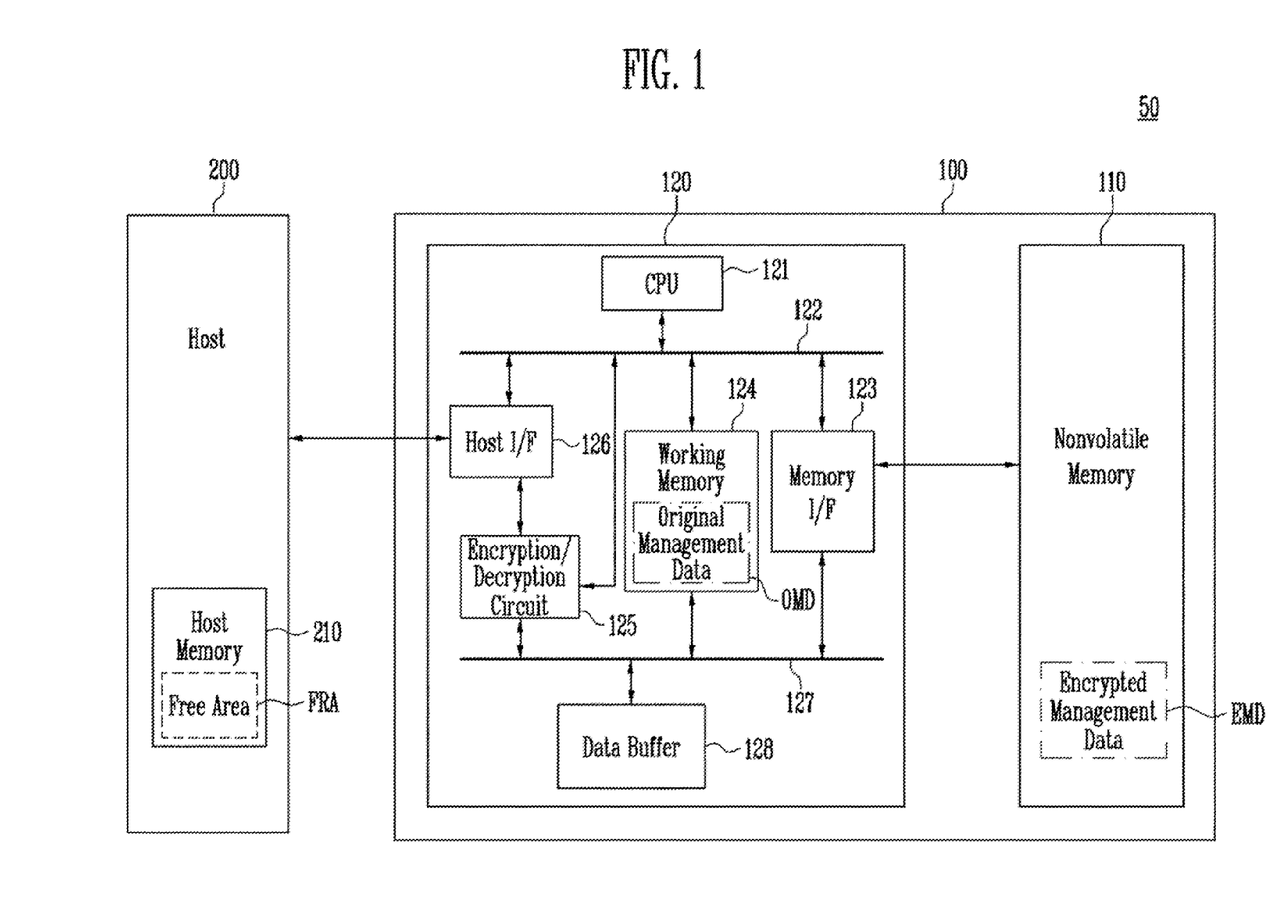
FIG. 1 is diagram illustrating a computing system including a semiconductor device according to an embodiment of the present invention.
Figure 2:
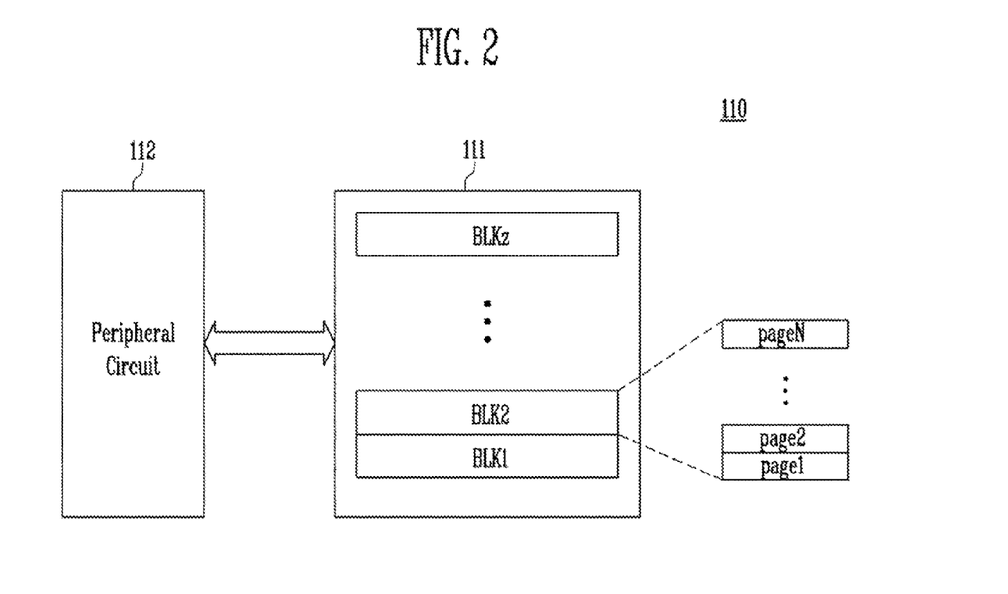
FIG. 2 is a block diagram illustrating a nonvolatile memory in the semiconductor device shown in FIG. 1.

FIG. 1 is a block diagram illustrating a computing system 50 including a semiconductor device 100 according to an embodiment of the present invention. FIG. 2 is a block diagram illustrating a nonvolatile memory 110 in the semiconductor device 100.

Referring to FIG. 1, the computing system 50 may include the semiconductor device 100 and a host 200.

The semiconductor device 100 may include the nonvolatile memory 110 and a memory controller 120.

The nonvolatile memory 110 may be controlled by the memory controller 120. For example, the nonvolatile memory 110 may be coupled to the memory controller 120 through a single channel. The nonvolatile memory 110 may include a memory cell array. The nonvolatile memory 110 may store data in the memory cell array and provide data stored in the memory cell array to the memory controller 120 in response to control of the memory controller 120.

Referring to FIG. 2, the nonvolatile memory 110 may include a memory cell array 111 and a peripheral circuit 112. The memory cell array 111 may include memory blocks BLK1 to BLKz. Each of the memory blocks BLK1 to BLKz may include a plurality of pages page1 to pageN.

The peripheral circuit 112 may be coupled to the memory cell array 111. The peripheral circuit 112 may be controlled by the memory controller 120. In response to control of the memory controller 120, the peripheral circuit 112 may be configured to program data into the memory cell array 111, read the data from the memory cell array 111, and erase the data from the memory cell array 111.

According to an embodiment, a read operation and a program operation of the nonvolatile memory 110 may be performed on the basis of the pages. An erase operation of the nonvolatile memory 110 may be performed on the basis of the memory blocks.

During a program operation, the peripheral circuit 112 may receive data to be programmed or a physical block address from the memory controller 120. The peripheral circuit 112 may program the data into a page corresponding to the physical block address. During a read operation, the peripheral circuit 112 may receive the physical block address from the memory controller 120. The peripheral circuit 112 may read data from a page corresponding to the physical block address and provide the read data to the memory controller 120. During an erase operation, the peripheral circuit 112 may receive the physical block address from the memory controller 120. The peripheral circuit 112 may erase data in a memory block corresponding to the physical block address.

According to an embodiment, the nonvolatile memory 110 may be a flash memory.

Management data may be stored in the memory cell array 111. The management data may refer to data required by the memory controller 120 to drive the semiconductor device 100. For example, the management data may be mapping information (hereinafter, map table) between a logical block address received from the host 200 and the physical block address provided to the nonvolatile memory 110. For example, the management data may be a boot code necessary to initialize the memory controller 120 when power is provided to the semiconductor device 100.

The data stored in the nonvolatile memory 110 may not be lost even in the absence of a power supply. Therefore, for example, when the semiconductor device 100 or the computing system 50 is lost, even the management data stored in the nonvolatile memory 110 is likely to be exposed. For this reason, encrypted management data EMD, as shown in FIG. 1, may be stored in the nonvolatile memory 110.

According to an embodiment, the encrypted management data EMD may be stored in a predetermined area of the memory cell array 111. For example, at least one of the memory blocks BLK1 to BLKz may be defined as a meta area, and the encrypted management data EMD may be stored in the meta area.

Referring again to FIG. 1, the memory controller 120 may include a central processing unit (CPU) 121, a control bus 122, a memory interface 123, a working memory 124, an encryption/decryption circuit 125, a host Interface 126, a data bus 127 and a data buffer 128.

According to an embodiment, the memory controller 120 may be allocated a free area FRA in a host memory 210 from the host 200, and configured to store the encrypted management data in the free area FRA. A detailed description thereof is given below.

The central processing unit 121 may be configured to control general operations of the memory controller 120. The central processing unit 121 may be configured to control the memory interface 123, the working memory 124, the encryption/decryption circuit 125 and the host interface 126 through the control bus 122. According to an embodiment, the central processing unit 121 may be coupled to a separate memory (not illustrated) storing firmware and operate in response to the firmware of the memory.

According to an embodiment, the central processing unit 121 may convert the logical block address received from the host 200 into a physical block address by using the map table stored in the working memory 124. The physical block address may be provided to the nonvolatile memory 110 through the memory interface 123.

According to an embodiment, the central processing unit 121 may initialize the memory controller 120 by using the boot code stored in the working memory 124.

The central processing unit 121 may request the host 200 to allocate a predetermined area of the host memory 210 to the semiconductor device 100. The memory controller 120 may access the free area FRA of the host memory 210. The memory controller 120 may be stably driven by using the free area FRA together with storage space of nonvolatile memories (124 and 128) in the memory controller 120.

According to an embodiment, the central processing unit 121 may request the free area FRA from the host 200 through the host interface 126. When an available storage space exists in the host memory 210, the host 200 may transfer information about the available storage space as a response message to the memory controller 120. Subsequently, the memory controller 120 may access the free area FRA in response to the response message. When the memory controller 120 requests data stored in the free area FRA, the host 200 may provide the requested data to the memory controller 120. When the memory controller 120 requests to write data into the free area FRA, the host 200 may write the corresponding data into the free area FRA. The computing system 50 may be configured in a unified memory architecture (UMA).

The control bus 122 may couple the central processing unit 121 to the memory interface 123, the working memory 124, the encryption/decryption circuit 125 and the host interface 126. The control bus 122 may be configured to transfer commands generated from the central processing unit 121 to the memory interface 123, the working memory 124, the encryption/decryption circuit 125 and the host interface 126.

The memory interface 123 may be coupled to the nonvolatile memory 110. The memory interface 123 may be configured to interface the nonvolatile memory 110 and the memory controller 120 in response to control of the central processing unit 121.

The working memory 124 may be coupled to the control bus 122 and the data bus 127. The working memory 124 may function as an operation memory of the central processing unit 121. The working memory 124 may store original management data OMD generated by decrypting part or all of the encrypted management data EMD. For example, when the computing system 50 is powered on, the central processing unit 121 may temporarily store the encrypted management data EMD read from the nonvolatile memory 110 in the working memory 124 or the data buffer 128. In addition, in response to control of the central processing unit 121, the encryption/decryption circuit 125 may decrypt the encrypted management data EMD temporarily stored in the working memory 124 or the data buffer 128 to generate the original management data OMD. The generated original management data OMD may be stored in the working memory 124.

According to an embodiment, the working memory 124 may be a nonvolatile memory and include Static RAM (SRAM), Dynamic RAM (DRAM) and Synchronous DRAM (SDRAM).

The memory controller 120 may operate by using the original management data OMD stored in the working memory 124. For example, the central processing unit 121 may initialize the memory controller 120 by using the boot code loaded into the working memory 124. Further, the central processing unit 121 may convert the logical block address received from the host 200 into a physical block address by using the map table loaded into the working memory 124.

The encryption/decryption circuit 125 may be coupled to the central processing unit 121 through the control bus 122 and coupled to the memory interface 123, the working memory 124 and the data buffer 128 through the data bus 127. The encryption/decryption circuit 125 may be controlled by the central processing unit 121.

The encryption/decryption circuit 125 may be coupled between the host interface 126 and the data bus 127. The encryption/decryption circuit 125 may encrypt or decrypt the management data communicated between the host interface 126 and the data bus 127 in response to the central processing unit 121. Alternatively, the encryption/decryption circuit 125 may transfer the management data communicated between the host interface 126 and the data bus 127 without encrypting and decrypting operations in response to control of the central processing unit 121. The management data may include the encrypted management data EMD and the original management data OMD.

According to an embodiment of the present invention, in response to control of the central processing unit 121, the encryption/decryption circuit 125 may be configured to encrypt or decrypt the management data communicated between the working memory 124 and the free area FRA. In addition, in response to control of the central processing unit 121, the encryption/decryption circuit 125 may be configured to transfer the management data communicated between the nonvolatile memory 110 and the free area FRA without encrypting and decrypting operations.

When the original management data OMD is outputted to the free area FRA from the working memory 124, the encryption/decryption circuit 125 may encrypt the original management data OMD to generate the encrypted management data EMD, and transfer the encrypted management data EMD to the host interface 126. The host interface 126 may transfer the encrypted management data EMD to the host 200. The transferred encrypted management data EMD may be stored in the free area FRA.

When the encrypted management data EMD of the nonvolatile memory 110 is outputted to the free area FRA, the memory controller 120 may read the encrypted management data EMD from the nonvolatile memory 110. For example, the encrypted management data EMD may be temporarily stored in the data buffer 128. The encryption/decryption circuit 125 may transfer the encrypted management data EMD to the host interface 126 without encrypting and decrypting operations when the encrypted management data EMD is provided. The encrypted management data EMD may be provided to the host 200 through the host interface 126 and stored in the free area FRA.

As a result, the encrypted management data EMD may be stored in the free area FRA.

The encrypted management data EMD of the free area FRA may be loaded into the working memory 124. The encryption/decryption circuit 125 may decrypt the encrypted management data EMD received from the host 200 through the host interface 126 to generate the original management data OMD. The generated original management data OMD may be provided to the working memory 124.

The encrypted management data EMD of the free area FRA may be stored in the nonvolatile memory 110 by the memory controller 120. The encryption/decryption circuit 125 may transfer the encrypted management data EMD received through the host interface 126 to the data bus 127 without encrypting and decrypting operations. The encrypted management data EMD may be transferred to the nonvolatile memory 110. According to an embodiment, the encrypted management data EMD may be temporarily stored in the data buffer 128 through the data bus 127, and be transferred to the nonvolatile memory 110 through the memory interface 123.

According to an embodiment of the present invention, the encrypted management data EMD may be stored in the host memory 210 outside the semiconductor device 100. Therefore, even when the management data of the semiconductor device 100 is stored in the host memory 210, security of the corresponding management data may be maintained.

According to an embodiment of the present invention, the encryption/decryption circuit 125 may be provided between the host interface 126 and the data bus 127. The management data may selectively bypass the encrypting and decrypting operations of the encryption/decryption circuit 125. By the bypass operation, power consumed to encrypt and decrypt the management data may be reduced, and time consumed to transmit and receive the management data may be reduced.

The data buffer 128 may be coupled to the data bus 127. The data buffer 128 may buffer data being communicated between the host 200 and the nonvolatile memory 110. For example, the data buffer 128 may temporarily store the data read from the nonvolatile memory 110. The data temporarily stored in the data buffer 128 may pass through the data bus 127, the encryption/decryption circuit 125 and the host interface 126 to be outputted to the host 200. The data buffer 128 may temporarily store the data received from the host 200. The data received from the host 200 may be provided to the data buffer 128 through the host interface 126, the encryption/decryption circuit 125 and the data bus 127. The data temporarily stored in the data buffer 128 may be transferred to the nonvolatile memory 110 through the memory interface 123 and stored in the nonvolatile memory 110.

According to an embodiment, the data buffer 128 may be a nonvolatile memory and include Static RAM (SRAM), (Dynamic RAM DRAM) or Synchronous DRAM (SDRAM).

As illustrated in FIG. 1, the memory controller 120 may include the plurality of buses 122 and 127. However, in another example, the memory controller 120 may include a single bus and the components (121, 123, 124, 125, 126, and 127) of the memory controller 120 may be coupled to the single bus. In this example, the single bus may function as the control bus 122 and the data bus 127 as shown in FIG. 1.

According to an embodiment, the computing system 50 may be any one of various types of electronic devices, such as computers, ultra-mobile PCs (UMPCs), workstations, net-books, personal digital assistants (PDAs), portable computers, web tablets, wireless phones, mobile phones, smart phones, e-book readers, portable multimedia players (PMPs), portable game machines, navigation devices, black boxes, digital cameras, three-dimensional televisions, digital audio recorders, digital audio players, digital picture recorders, digital picture players, digital video recorders and digital video players; any one of various electronic devices constituting a telematics network; an RFID device; or any one of various types of components constituting a computing system.

Figure 3:
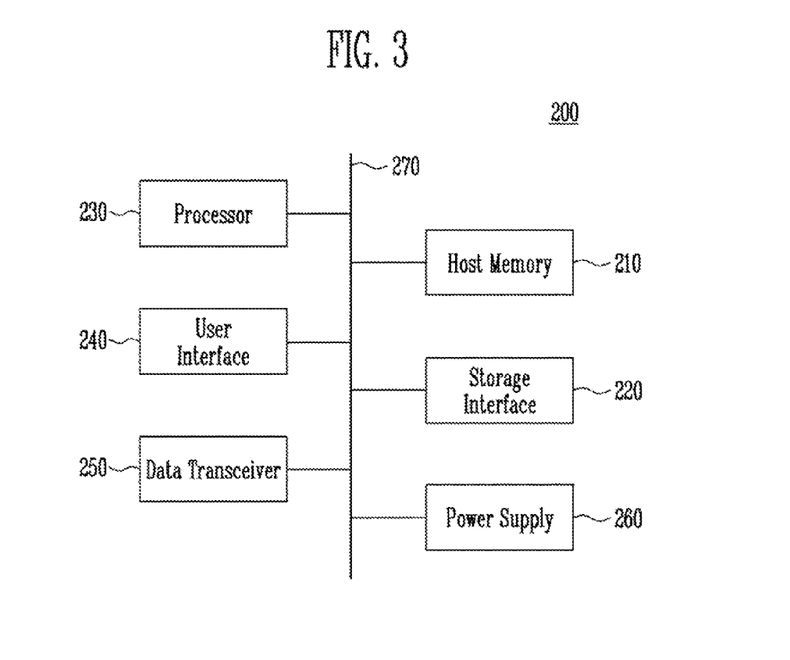
FIG. 3 is a block diagram illustrating a host shown in FIG. 1.

FIG. 3 is a block diagram illustrating the host 200 shown in FIG. 1.

Referring to FIG. 3, the host 200 may include the host memory 210, a storage interface 220, a processor 230, a user interface 240, a data transceiver 250, a power supply 260 and a system bus 270. The system bus 270 may couple the host memory 210, the storage interface 220, the processor 230, the user interface 240, the data transceiver 250 and the power supply 260.

The host memory 210 may function as an operation memory of the processor 230. As described with reference to FIG. 1, the host memory 210 may include the free area. The free area may be a storage space allocated to the semiconductor device 100. According to an embodiment, the processor 230 may load data into an area of the host memory 210, except for the free area, process the loaded data and feedback the processed data to the host memory 210.

The host memory 210 may be a nonvolatile memory. According to an embodiment, the host memory 210 may include at least one of Static RAM (SRAM), Dynamic RAM (DRAM) and Synchronous DRAM (SDRAM).

The storage interface 220 may be configured to interface the host 200 and the memory controller 120. The host 200 may exchange data with the memory controller 120 through the storage interface 220. The data processed by the processor 230, the data provided through the user interface 240, or the data received by the data transceiver 250 may be stored in the semiconductor device 100 through the storage interface 220.

The user interface 240 may include a module to which a control signal for controlling operations of the processor 230 or data to be processed by the processor 230 are inputted. According to an embodiment, the user interface 240 may include at least one of a pointing device, such as a touch pad and a computer mouse, a keypad, and a keyboard. In addition, the user interface 240 may include a module for displaying the data received from the semiconductor device 100 through the storage interface 220, the data received from the data transceiver 250, and the data processed by the processor 230.

The data transceiver 250 may exchange a signal with an external device. For example, the data transceiver 250 may be coupled to an external device and exchange a signal through at least one of a wired network or a wireless network. The data transceiver 250 may convert a signal, received from the external device, into data to be processed by the processor 230, and convert data, received from the host 200, into a signal to be transferred through the network.

Figure 4:
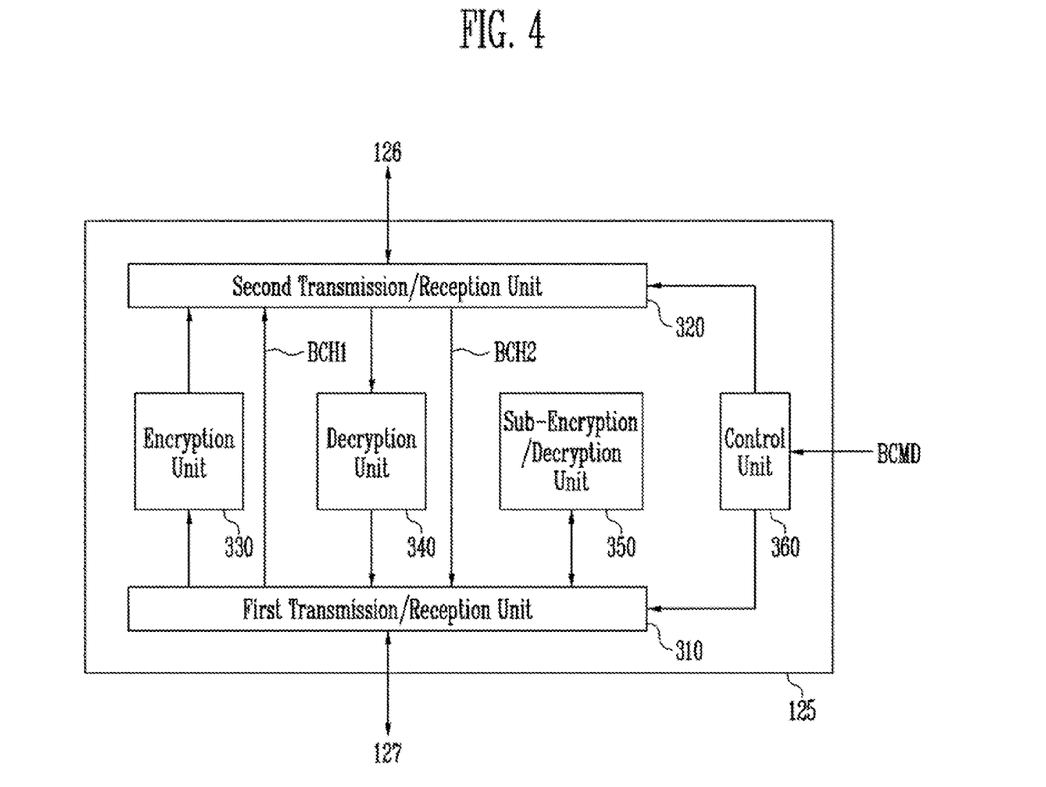
FIG. 4 is a block diagram illustrating an encryption/decryption circuit shown in FIG. 1.

FIG. 4 is a block diagram illustrating the encryption/decryption circuit 125 shown in FIG. 1.

Referring to FIGS. 1 and 4, the encryption/decryption circuit 125 may include a first transmission/reception unit 310, a second transmission/reception unit 320, first and second bypass channels BCH1 and BCH2, an encryption unit 330, a decryption unit 340, a sub-encryption/decryption unit 350 and a control unit 360.

The first transmission/reception unit 310 may be coupled to the data bus 127. The first transmission/reception unit 310 may communicate with the memory interface 123, the working memory 124 and the data buffer 128 through the data bus 127. The second transmission/reception unit 320 may communicate with the host interface 126.

The encryption unit 330 may be configured to encrypt data received through the first transmission/reception unit 310 and transfer the encrypted data to the second transmission/reception unit 320. The first bypass channel BCH1 may be configured to transfer the data received through the first transmission/reception unit 310 to the second transmission/reception unit 320. The data may bypass the encryption unit 330 through the first bypass channel BCH1.

The decryption unit 340 may be configured to decrypt the data received through the second transmission/reception unit 320 and transfer the decrypted data to the first transmission/reception unit 310. The second bypass channel BCH2 may be configured to transfer the data received through the second transmission/reception unit 320 to the first transmission/reception unit 310. The data may bypass the decryption unit 340 through the second bypass channel BCH2.

The sub-encryption/decryption unit 350 may be configured to encrypt the data received through the first transmission/reception unit 310 and feedback the encrypted data to the first transmission/reception unit 310.

When the management data is loaded into the working memory 124 from the nonvolatile memory 110, the encrypted management data EMD read from the nonvolatile memory 110 may be transferred to the first transmission/reception unit 310 through the data bus 127. When the encrypted management data EMD is transferred to the sub-encryption/decryption unit 350 through the first transmission/reception unit 310, the sub-encryption/decryption unit 350 may decrypt the encrypted management data EMD to generate the original management data OMD, and transfer the original management data OMD to the first transmission/reception unit 310. Subsequently, the original management data OMD may be stored in the working memory 124 through the first transmission/reception unit 310.

The control unit 360 may be configured to control general operations of the encryption/decryption circuit 125 in response to control of the central processing unit 121. The control unit 360 may receive a bypass command BCMD from the central processing unit 121. In response to the bypass command BCMD, the control unit 360 may control the first transmission/reception unit 310 so that the data received through the data bus 127 may be outputted to the encryption unit 330 or the first bypass channels BCH1.

For example, when the original management data OMD of the working memory 124 is outputted to the host 200, the bypass command BCMD may be disabled. When the bypass command BCMD is disabled, the first transmission/reception unit 310 may output the original management data OMD received through the data bus 127 to the encryption unit 330 in response to control of the control unit 360. The original management data OMD may be encrypted by the encryption unit 330.

For example, when the encrypted management data EMD of the nonvolatile memory 110 is outputted to the host 200, the bypass command BCMD may be enabled. When the bypass command BCMD is enabled, the first transmission/reception unit 310 may output the encrypted management data EMD received through the data bus 127 to the first bypass channel BCHD1 in response to control of the control unit 360. The encrypted management data EMD may bypass the encryption unit 330.

When the encrypted management data EMD is read from the free area FRA, the encrypted management data EMD may be received through the host interface 126 and the second transmission/reception unit 320. The control unit 360 may control the second transmission/reception unit 320 to output the encrypted management data EMD to the decryption unit 340 or the second bypass channel BCH2 in response to the bypass command BCMD.

When the encrypted management data EMD of the free area FRA is loaded into the working memory 124, the bypass command BCMD may be disabled. The second transmission/reception unit 320 may transfer the encrypted management data EMD to the decryption unit 340 in response to control of the control unit 360. The first transmission/reception unit 310 may receive the original management data OMD generated by the decryption unit 340 and transfer the original management data OMD to the working memory 124 through the data bus 127.

When the encrypted management data EMD in the free area FRA is stored in the nonvolatile memory 110, the bypass command BCMD may be enabled. The second transmission/reception unit 320 may transfer the encrypted management data EMD to the second bypass channels BCH2 in response to control of the control unit 360. For example, the encrypted management data EMD may be temporarily stored in the data buffer 128 and be provided to the nonvolatile memory 110 through the memory interface 123.

Figure 5:
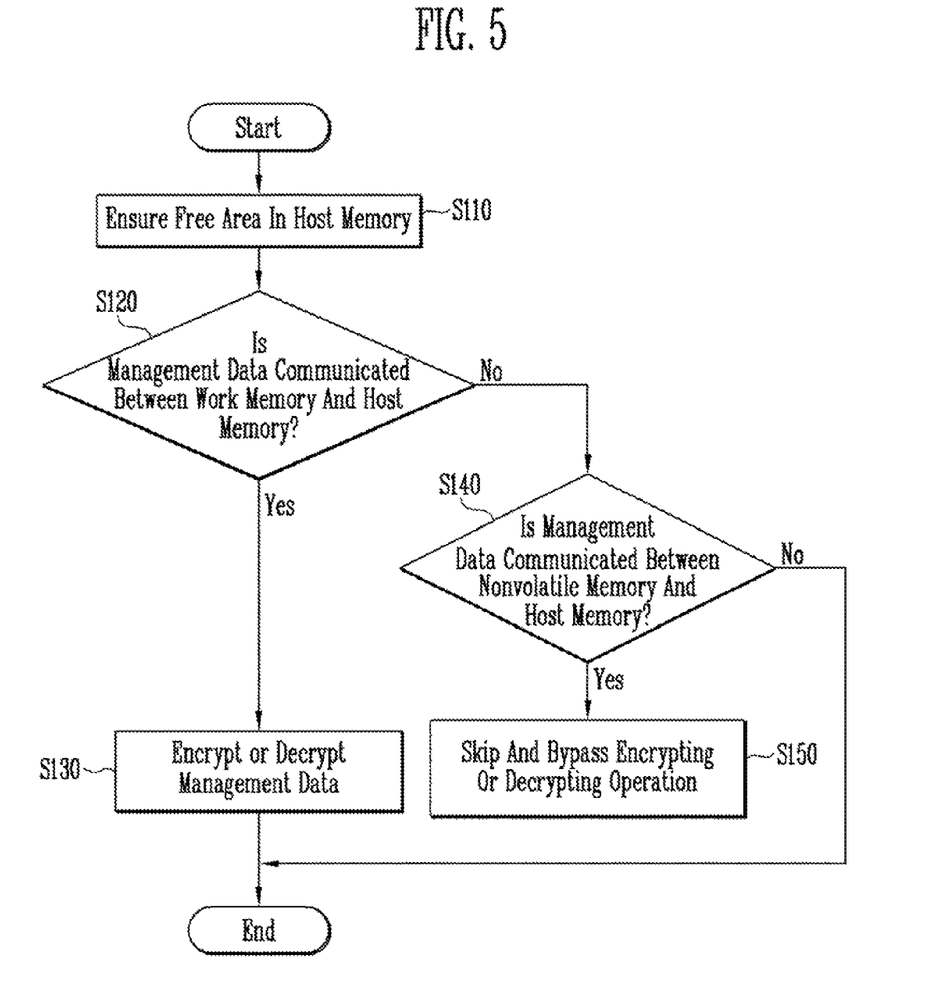
FIG. 5 is a flowchart illustrating a method of operating a semiconductor device according to an embodiment of the present invention.

FIG. 5 is a flowchart illustrating a method of operating the semiconductor device 100 according to an embodiment of the present invention.

Referring to FIGS. 1 and 5, at step S110, the memory controller 120 may ensure the free area FRA in the host memory 210. According to an embodiment, the central processing unit 121 may request the free area FRA from the host 200. When an available storage space exists in the host memory 210, the host 200 may transfer information corresponding to the free area FRA as a response message to the memory controller 120. Based on the response message, the memory controller 120 may access the free area FRA. For example, the memory controller 120 may store and read data to and from the free area FRA.

At step S120, it may be determined whether the management data is communicated between the working memory 124 and the free area FRA of the host memory 210.

At step S130, when the management data is communicated between the working memory 124 and the free area FRA of the host memory 210, the management data may be encrypted or decrypted.

When it is determined that the management data is not communicated between the working memory 124 and the free area FRA of the host memory 210 at the step S120, it may be determined at step S140 whether the management data is communicated between the nonvolatile memory 110 and the host memory 210.

At step S150, when the management data is communicated between the nonvolatile memory 110 and the host memory 210, the management data may bypass encryption or decryption operations.

In various examples of the memory controller 120, the central processing unit 121 may transfer the management data from the working memory 124 to the host memory 210 and load the management data from the host memory 210 to the working memory 124. In addition, the central processing unit 121 may transfer the management data from the nonvolatile memory 110 to the host memory 210 and from the host memory 210 to the nonvolatile memory 110.

According to an embodiment, when the management data is a map table, the central processing unit 121 may store map table information, which is frequently used, in the working memory 124 and store map table information, which is not frequently used, in the host memory 210. In addition, the central processing unit 121 may store map table information, which is rarely used, in the nonvolatile memory 110. According to an embodiment, the central processing unit 121 may store recently used map table information in the working memory 124, store map table information, which is not used for a predetermined period of time, in the host memory 210, and store map table information, which is used less than the predetermined period of time, in the nonvolatile memory 110. According to an embodiment, cold data of the management data may be stored in the nonvolatile memory 110, and hot data of the management data may be stored in the host memory 210. Very hot data of the management data may be stored in the working memory 124.

According to an embodiment, when the semiconductor device 100 or the computing system 50 enters a sleep mode, the management data of the working memory 124 and the management data of the host memory 210 may be stored in the nonvolatile memory 110. The memory controller 120 may read the encrypted management data EMD from the host memory 210, and store the encrypted management data EMD in the nonvolatile memory 110 by bypassing encrypting and decrypting operations. In addition, the memory controller 120 may encrypt the original management data OMD of the working memory 124 by using the sub-encryption/decryption unit 350 and store the encrypted management data EMD in the nonvolatile memory 110.

According to an embodiment, when the semiconductor device 100 enters a sleep mode, the management data stored in the working memory 124 may be outputted to the host memory 210. In other words, in sleep mode, the management data of the working memory 124 may be stored in the host memory 210, rather than the nonvolatile memory 110 having relatively low read and write speeds. The original management data OMD of the working memory 124 may be encrypted by the encryption/decryption circuit 125 and converted into the encrypted management data EMD. The encrypted management data EMD may be stored in the host memory 210. As a result, the semiconductor device 100 may quickly enter the sleep mode. Subsequently, when the semiconductor device 100 switches from the sleep mode to an active mode, the encrypted management data EMD of the host memory 210 may be read by the memory controller 120 and decrypted by the encryption/decryption circuit 125 so that the encrypted management data EMD may be converted into the original management data OMD. The original management data OMD may be loaded into the working memory 124. Therefore, when the semiconductor device 100 enters the active mode, the original management data OMD may be quickly loaded into the working memory 124.

According to an embodiment, when the semiconductor device 100 enters the sleep mode, the management data stored in the nonvolatile memory 110 may be outputted to the host memory 210. The memory controller 120 may read the encrypted management data EMD from the nonvolatile memory 110, and output the encrypted management data EMD to the host 200 by bypassing encrypting and decrypting operations. Since the read speed of the nonvolatile memory 110 is relatively slow, it may take a relatively long time for the semiconductor device 100 to enter the sleep mode. On the other hand, when the semiconductor device 100 switches from the sleep mode to the active mode, the semiconductor device 100 may read the encrypted management data EMD from the host memory 210 and load the original management data OMD to the working memory 124. Therefore, when the semiconductor device 100 enters the active mode, the original management data OMD may be quickly loaded into the working memory 124.

Figure 6:
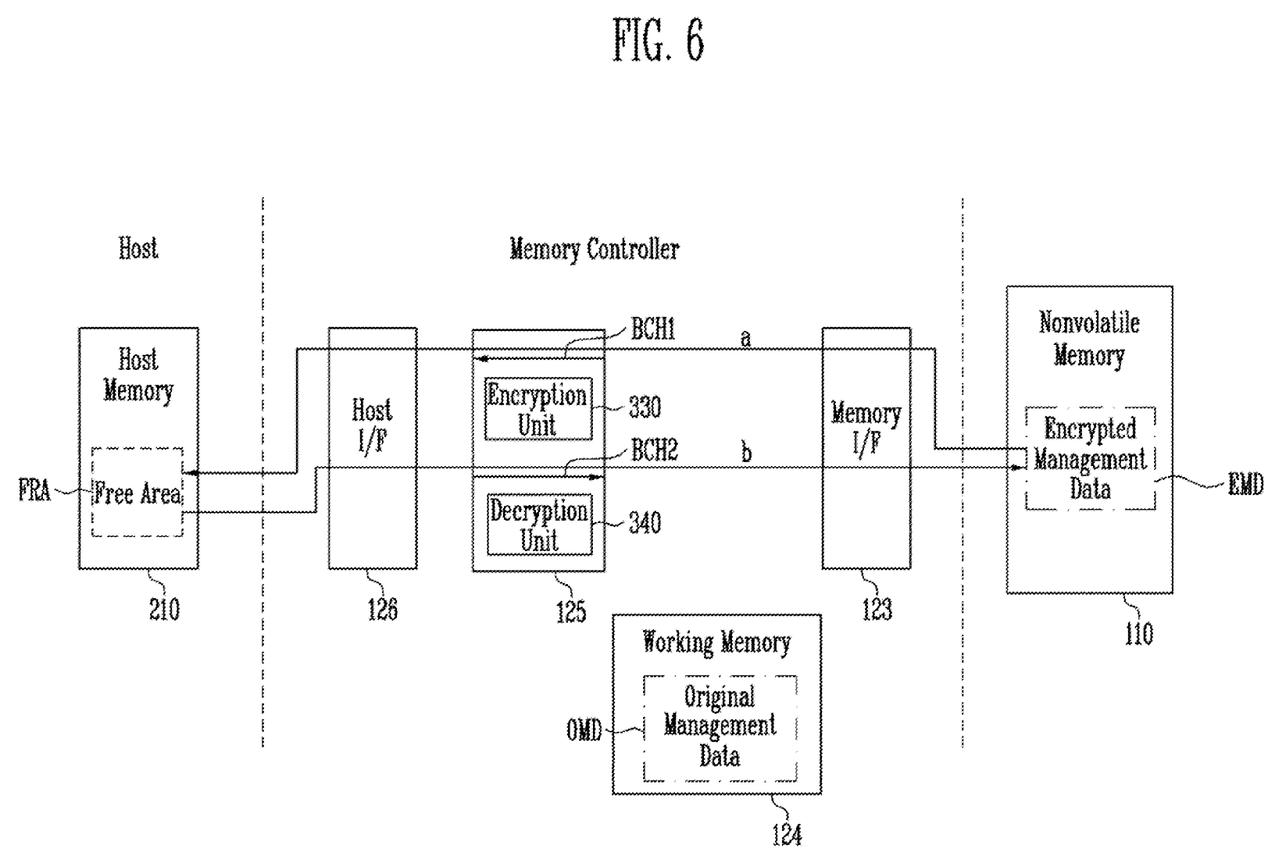
FIGS. 6 and 7 are views illustrating a flow of management data between a host and a semiconductor device.
Figure 7:
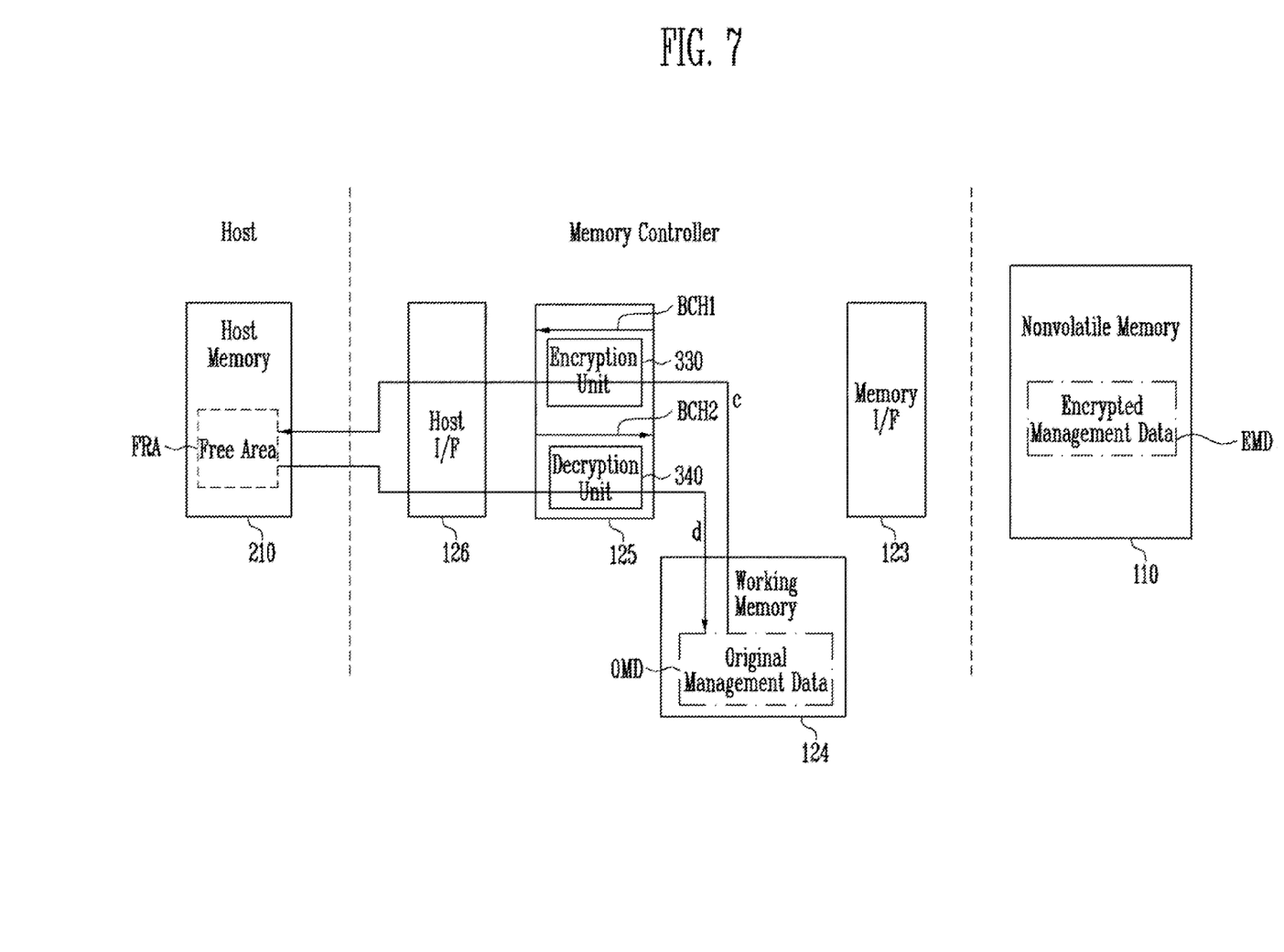

FIGS. 6 and 7 are views illustrating the flow of the management data between the host 200 and the semiconductor device 100.

Referring to FIG. 6, when the encrypted management data EMD of the nonvolatile memory 110 is outputted to the free area FRA, the encrypted management data EMD may be transferred without encryption or decryption (a). The encrypted management data EMD of the nonvolatile memory 110 may be read by the memory controller 120 through the memory interface 123. According to an embodiment, the read encrypted management data EMD may be temporarily stored in the data buffer 128 shown in FIG. 1. The encrypted management data EMD may be outputted to the host 200 through the encryption/decryption circuit 125 and the host interface 126. The encryption/decryption circuit 125 may transfer the encrypted management data EMD to the host interface 126 through the first bypass channels BCH1. The host interface 126 may output the encrypted management data EMD to the host 200. The host 200 may store the encrypted management data EMD in the free area FRA at the request of the memory controller 120.

When the encrypted management data EMD of the free area FRA is outputted to the nonvolatile memory 110, the encrypted management data EMD may be transferred without encryption or decryption (b). The encrypted management data EMD of the free area FRA may be read by the memory controller 120 through the host interface 126. The encrypted management data EMD may be transferred through the second bypass channels BCH2 by bypassing the decryption unit 340. According to an embodiment, the encrypted management data EMD may be temporarily stored in the data buffer 128 as shown in FIG. 1. Subsequently, the encrypted management data EMD may be outputted to the nonvolatile memory 110 through the memory interface 123.

As a result, when the management data is communicated between the nonvolatile memory 110 and the host 200, the management data may bypass encrypting and decrypting operations. Therefore, power consumed to encrypt and decrypt the management data may be reduced, and time consumed to communicate the management data may be reduced.

Referring to FIG. 7, when the original management data OMD of the working memory 124 is outputted to the free area FRA, the original management data OMD may be encrypted (c). The original management data OMD of the working memory 124 may be encrypted through the encryption unit 330 of the encryption/decryption circuit 125, and outputted to the host 200 through the host interface 126. The encrypted management data EMD may be stored in the free area FRA.

When the encrypted management data EMD of the free area FRA is loaded into the working memory 124, the encrypted management data EMD may be decrypted (d). The encrypted management data EMD of the free area FR may be read by the memory controller 120 through the host interface 126. The encrypted management data EMD may be decrypted by the decryption unit 340 and converted into the original management data OMD. Subsequently, the original management data OMD may be stored in the working memory 124.

Figure 8:
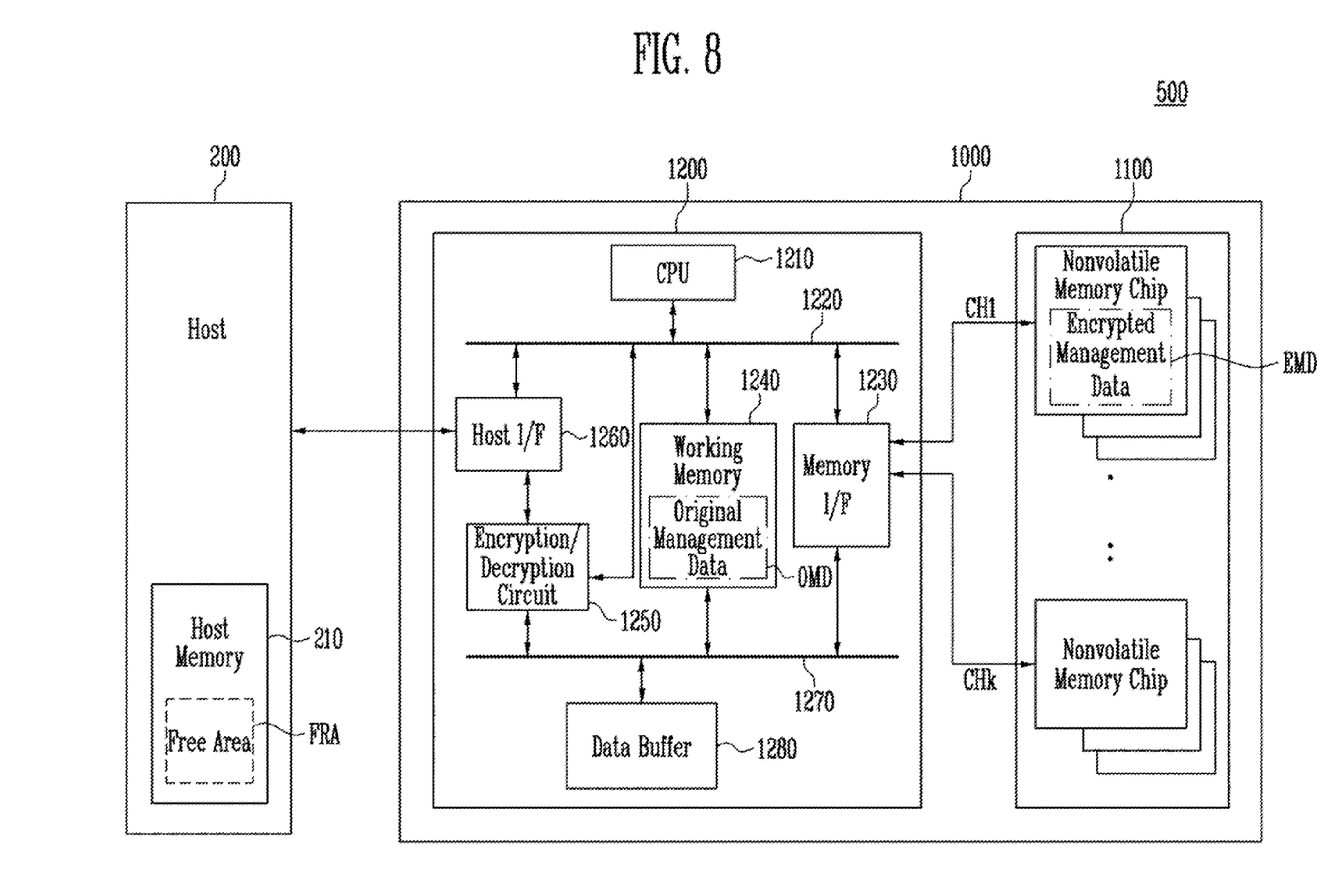
FIG. 8 is a block diagram illustrating a computing system according to another embodiment of the present invention.

FIG. 8 is a block diagram illustrating a computing system 500 according to another embodiment of the present invention.

Referring to FIG. 8, the computing system 500 may include a semiconductor device 1000 and a host 200. The semiconductor device 1000 may include a nonvolatile memory 1100 and a memory controller 1200. The memory controller 1200 may include a central processing unit 1210, a control bus 1220, a memory interface 1230, a working memory 1240, an encryption/decryption circuit 1250, a host interface 1260, a data bus 1270 and a data buffer 1280. The host 200 may include the host memory 210 including the free area FRA.

The nonvolatile memory 1100 may include a plurality of nonvolatile memory chips. The plurality of nonvolatile data chips may be divided into a plurality of groups.

As illustrated in FIG. 8, the plurality of groups may communicate with the memory interface 1230 through first to k-th channels CH1 to CHk, respectively. Each of the nonvolatile memory chips may be configured and operated substantially the same as the nonvolatile memory 110 as described above with reference to FIG. 2. Each of the groups may communicate with the memory interface 1230 through a single common channel. At least one of the plurality of nonvolatile memory chips may store the encrypted management data EMD.

The memory controller 1200 may have a substantially similar configuration to the memory controller 120 as described above with reference 1, except that the memory interface 1230 is coupled to the plurality of nonvolatile memory chips. The memory controller 1200 may communicate with the nonvolatile memory 1100 through the first to k-th channels CH1 to CHk.

As illustrated in FIG. 8, the plurality of nonvolatile memory chips may be coupled to a single channel. However, the semiconductor device 1000 may be modified so that a single nonvolatile memory chip may be coupled to a single channel.

According to an embodiment of the present invention, encrypted management data may be stored in a host memory outside a semiconductor device. Therefore, even when the management data of the semiconductor device is stored in the host memory, security of the management data may be maintained.

According to an embodiment of the present invention, an encryption/decryption circuit may be provided between a host interface and a data buffer, and management data may selectively bypass the encrypting and decrypting operations of the encryption/decryption circuit. By way of the bypass operation, power consumed to encrypt and decrypt the management data may be reduced, and time consumed to transmit and receive the management data may be reduced.

According to embodiments of the present invention, security of a computing system including a semiconductor device may be improved.

What is claimed is:

1. A semiconductor device, comprising:
a nonvolatile memory configured to store encrypted management data; and
a memory controller configured to be coupled between the nonvolatile memory and a host,
wherein the memory controller is allocated a free area in a host memory from the host and stores the encrypted management data in the free area,
wherein the memory controller includes:
a working memory configured to store original management data obtained by decrypting the encrypted management data;
a central processing unit configured to request the host to allocate the free area in the host memory; and
an encryption/decryption circuit configured to encrypt the original management data or decrypt the encrypted management data, respectively, when the original management data and the encrypted management data are communicated between the working memory and the free area, and to bypass the encrypted management data when the encrypted management data is communicated between the nonvolatile memory and the free area, in response to control of the central processing unit
wherein, when an available storage space exists in the host memory, the host transfers information about the available storage space as a response message to the memory controller,
wherein the free area is in the host memory allocated to the semiconductor device, and
wherein the host loads data into the host memory except for the free area.

2. The semiconductor device of claim 1, wherein the memory controller further includes:
a memory interface configured to communicate with the nonvolatile memory;
a host interface configured to communicate with the host; and
a data bus configured to couple the memory interface, the encryption/decryption circuit and the working memory,
wherein the encryption/decryption circuit is coupled between the host interface and the data bus.

3. The semiconductor device of claim 2, wherein when the original management data of the working memory is outputted to the host, the encryption/decryption circuit transfers the original management data from the working memory to the host interface by encrypting the original management data.

4. The semiconductor device of claim 2, wherein when the encrypted management data of the nonvolatile memory is outputted to the host, the encryption/decryption circuit transfers the encrypted management data from the memory interface to the host interface without the encrypting and decrypting of the encrypted management data.

5. The semiconductor device of claim 2, wherein when the encrypted management data of the free area is loaded into the working memory, the encryption/decryption circuit transfers the encrypted management data from the host interface to the working memory by decrypting the encrypted management data.

6. The semiconductor device of claim 2, wherein when the encrypted management data of the free area is stored in the nonvolatile memory, the encryption/decryption circuit transfers the encrypted management data from the host interface to the memory interface without the encrypting and decrypting of the encrypted management data.

7. The semiconductor device of claim 1, wherein the encrypted management data is mapping information between a physical block address corresponding to the nonvolatile memory and a logical block address corresponding to the host.

8. The semiconductor device of claim 1, wherein the encrypted management data is a boot code to initialize the memory controller.

9. A memory controller processing management data between a host and a nonvolatile memory, the memory controller comprising:
a working memory configured to store the management data;
a memory interface configured to communicate with the nonvolatile memory;
a host interface configured to communicate with the host;
a central processing unit configured to request a free area in a host memory of the host; and
an encryption/decryption circuit configured to encrypt or to decrypt the management data when the management data is communicated between the working memory and the free area, and to bypass the management data when the management data is communicated between the nonvolatile memory and the free area, in response to control of the central processing unit,
wherein, when an available storage space exists in the host memory, the host transfers information about the available storage space as a response message to the memory controller,
wherein the free area is in the host memory allocated to a semiconductor device including the memory controller and the nonvolatile memory, and
wherein the host loads data into the host memory except for the free area.

10. The memory controller of claim 9, wherein encrypted management data that is obtained by encrypting the management data is stored in the free area and the nonvolatile memory.

11. The memory controller of claim 9, wherein the encryption/decryption circuit is coupled to the working memory and the memory interface through a data bus, and the host interface is coupled to the data bus through the encryption/decryption circuit.

12. The memory controller of claim 9, wherein the encryption/decryption circuit, the working memory, the memory interface and the host interface operate in response to control of the central processing unit through a control bus.

13. The memory controller of claim 9, wherein the encryption/decryption circuit includes:
a first transmission/reception unit configured to receive the management data from the working memory and the memory interface through a data bus;
a second transmission/reception unit configured to communicate with the host interface;
an encryption unit configured to encrypt the management data received through the first transmission/reception unit and to transfer encrypted management data to the second transmission/reception unit;

a bypass channel configured to transfer the management data received through the first transmission/reception unit to the second transmission/reception unit by bypassing the encryption unit; and a control unit configured to control the first transmission/reception unit to output the management data received from the working memory through the data bus to the encryption unit, and output the management data received from the memory interface through the data bus to the bypass channel in response to a bypass command from the central processing unit.

14. The memory controller of claim 9, wherein the encryption/decryption circuit includes:

a first transmission/reception unit configured to communicate with the working memory and the memory interface through a data bus;

a second transmission/reception unit configured to receive the management data from the host interface;

a decryption unit configured to decrypt the management data received through the second transmission/reception unit and to transfer decrypted management data to the first transmission/reception unit;

a bypass channel configured to transfer the management data received through the second transmission/reception unit to the first transmission/reception unit by bypassing the decryption unit; and a control unit configured to control the second transmission/reception unit to output the management data received from the host interface to one of the decryption unit and the bypass channel in response to a bypass command from the central processing unit.

15. A method of operating a memory controller processing management data between a nonvolatile memory and a host, the method comprising:

generating original management data by decrypting the management data read from the nonvolatile memory and storing the original management data in a working memory of the memory controller;

requesting a free area in a host memory of the host;

encrypting or decrypting the management data when the management data is communicated between the working memory and the free area; and bypassing the encrypting or decrypting of the management data when the management data is communicated between the nonvolatile memory and the free area, wherein, when an available storage space exists in the host memory, the host transfers information about the available storage space as a response message to the memory controller, wherein the free area is in the host memory allocated to a semiconductor device, and wherein the host loads data into the host memory except for the free area.

16. The method of claim 15, wherein the encrypting or decrypting of the management data includes:

generating encrypted management data by encrypting the original management data stored in the working memory; and outputting the encrypted management data to the host.

17. The method of claim 15, wherein the encrypting or decrypting of the management data includes:

receiving the management data from the free area;

generating the original management data by decrypting the management data; and storing the original management data in the working memory.

18. The method of claim 15, wherein the bypassing of the encrypting or decrypting of the management data includes:

reading the management data from the nonvolatile memory; and outputting the management data to the host without encrypting or decrypting the management data.

19. The method of claim 15, wherein the bypassing of the encrypting or decrypting of the management data includes:

receiving the management data from the free area; and outputting the management data to the nonvolatile memory without encrypting or decrypting the management data.

* * * * *